March 23, 1965 C. MacDONALD 3,175,035

SYSTEM FOR REPRODUCING RECORDED VIDEO SIGNALS

Filed Dec. 27, 1962 2 Sheets-Sheet 1

WITNESSES
Theodore F. Wrobel
Leon M. Garman

INVENTOR
Copthorne Macdonald
BY
ATTORNEY

March 23, 1965 C. MacDONALD 3,175,035

SYSTEM FOR REPRODUCING RECORDED VIDEO SIGNALS

Filed Dec. 27, 1962 2 Sheets-Sheet 2

United States Patent Office 3,175,035
Patented Mar. 23, 1965

3,175,035
SYSTEM FOR REPRODUCING RECORDED VIDEO SIGNALS

Copthorne Macdonald, Elmira, N.Y., assignor to Westinghouse Electric Corporation, Pittsburgh, Pa., a corporation of Pennsylvania Filed Dec. 7, 1962, Ser. No. 247,732
6 Claims. (Cl. 178—6.6)

This invention relates generally to the reproduction of recorded video pictures and, more particularly, to a method and apparatus for compensating for speed variations which are common in normal playback apparatus utilized in such systems.

One problem which is common to most video recording and playback systems is that of speed variation in the playback apparatus itself. In its most common form, the scene to be preserved is recorded on an elongated tape for future use. The most common types of tapes being utilized are those utilizing either magnetic or thermoplastic effects. In any case, and this is particularly true in the case of tape recorders, it is necessary to provide some means for the correction of variations in the playback apparatus speed in order that adjacent lines as viewed on the video monitor are not skewed; that is, there is vertical alignment of video information.

The skewing or staggering of adjacent lines becomes particularly noticeable in so-called slow-scan television systems such as are used in satellites and Atlantic cable television transmission. There has been, however, no widespread commercial use of such slow-scan systems. Such systems would, however, be of great use in a variety of fields, such as in the educational field, where the scenes are slowly changing and it is not necessary to preserve the illusion of motion. In the educational field, great use could be made of such a slow-scan system by simultaneously recording the oral and video lecture for subsequent presentation to students in other locations or at a different time. While it is true that wide-band video tape recorders are presently capable of providing satisfactory reproduction, their cost, in many instances, is prohibitive.

It has been found that a conventional audio tape recorder has adequate bandwidth to record a TV image of several hundred lines resolution at frame times of a few seconds. If a stereo tape recorder is utilized, video and audio can be recorded simultaneously. While the speed regulation of such audio tape recorders is adequate for the satisfactory reproduction of audio signals, it has been found, when video information is thus recorded and subsequently reproduced by such devices, that the speed regulation is inadequate to assure proper alignment of subsequent lines on the cathode ray tube monitor and that there is, as a result thereof, a considerable amount of skewing of adjacent lines. Several solutions have been proposed in the past to compensate for this variation in speed by adjusting in one manner or another the speed of the playback apparatus. These systems have all attempted, through the use of various mechanisms, for example servomechanisms, to adjust the speed of the playback apparatus in order to avoid the aforementioned skewing. While such systems have met with some success, they are necessarily slow, cumbersome, expensive, and difficult to control.

It is, therefore, an object of the present invention to provide an improved system for the reproduction of recorded video information.

A further object is to provide an improved method and means for compensating for speed variations of the playback apparatus in a recorded video system.

Another object is to provide a recorded video system which utilizes means to vary the scan rate of the display device in order to compensate for these variations in the record playback apparatus.

Stated briefly, the present invention provides a recording medium, preferably an elongated tape, onto which has been recorded a video signal, or video information, and a continuous synchronization signal or time reference base. Through relative movement between the recording medium and a suitable transducer, there is provided an electrical signal which is representative of the video information recorded on the recording media. This video signal is processed through a suitable system employing a visual display device, for example a cathode ray tube, to provide an image or pattern corresponding to the recorded information. The time reference base portion of the record also produces an electrical signal which in turn is fed through suitable discriminator means, the output of which is utilized to vary the scanning rate of the electron beam of the visual display device. The discriminator means senses a frequency change which corresponds to speed variations in the relative movement between the transducer and the recording medium and produces a signal corresponding to these variations which may be utilized to vary the aforementioned scanning rate. By the proper adjustment of this scanning rate, skewing of adjacent lines on the cathode ray tube is compensated for and adjacent lines of the information pattern of the cathode ray tube are in proper alignment.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings in which.

Figure 1:
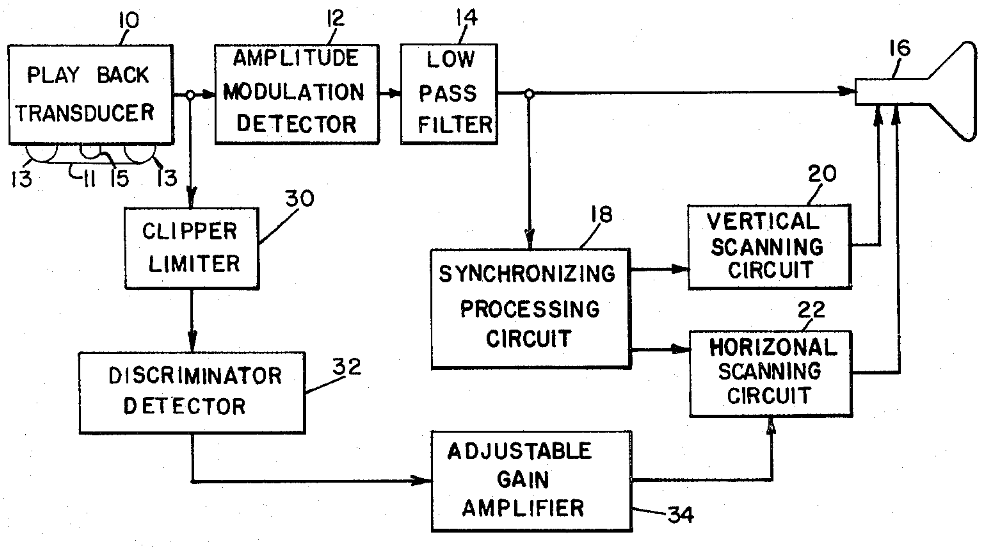
FIG. 1 is a block diagram of a system for the reproduction of recorded video information which embodies the corrective means of the present invention.
Figure 3A:
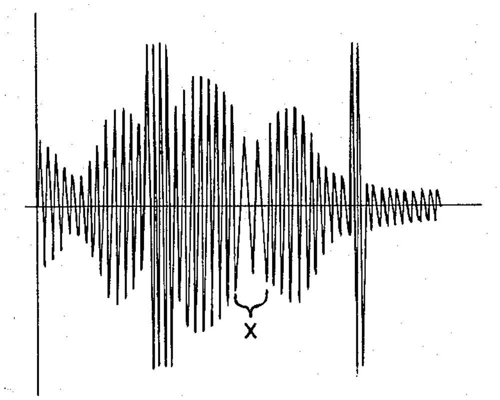
FIGS. 3A, 3B and 3C are graphical illustrations of the signal waveforms found at various points within the corrective circuit of FIG. 2 which are helpful in the understanding of the present invention.

With reference now to FIG. 1, there is shown, in block form, a video reproduction system utilizing the present invention. The system includes a playback transducer 10, which for purposes of illustration in the preferred embodiment as shown, may be a conventional audio tape recorder. It will be assumed, for purposes of this illustration, that the suitable recording medium utilized by the transducer 10 is an elongated tape 11 which is passed adjacent a pickup head 15 as it is wound from the first to a second of two spools 13 by suitable motor means (not shown) in a manner well known in the art. Further, this tape has video information recorded thereon in the form of amplitude modulation of a constant frequency carrier. The waveform of such an amplitude modulated carrier is shown in FIG. 3A. It is also noted in FIG. 3A that the synchronizing pulses for the vertical and horizontal scanning circuits (the highest peaks) may also be superimposed upon this constant frequency carrier.

Relative movement between the transducer 10 and its associated recording medium results in the production of an electrical signal corresponding to the originally recorded amplitude modulated carrier. This signal is then fed to an amplitude modulation detector 12, thence to a low pass filter 14 and from the filter 14 to a suitable image displaying device 16 such as a cathode ray tube. The display device 16 is one which forms an image by intensity modulation of an electron beam which scans a display screen thereof on a line by line basis in a manner which is well known in the art. The signal from the low pass filter 14 is also supplied to a synchronizing processing circuit 18 which serves to separate the vertical from the horizontal synchronizing pulses. These pulses are then fed to respectively a vertical scanning circuit 20 and a horizontal scanning circuit 22 which in turn provide the requisite voltages for causing the beam of the device 16 to progressively scan a display screen thereof. The system which has been described thus far is that which is ordinary in the art, and for an example of a more complete description of this portion of the system, reference is made to the August and September 1958 issues of the QST magazine. In the above issues of this magazine, starting respectively on pages 11 and 31, there is described in an article by Copthorne Macdonald, titled "A New Narrow-Band Image Transmission System," a video reproduction system suitable for use with the present invention.

While the system described thus far will produce an image upon the display device 16, it is readily apparent that any variation in speed within the playback transducer 10 will result in a skewing of adjacent lines on the display device 16. The present invention provides that the signal from the playback transducer 10 is also supplied to a clipper-limiter 30 and from there to a discriminator detector 32. The discriminator detector 32 produces a signal which when amplified by an adjustable gain amplifier 34 and applied to the horizontal scanning circuit 22 serves to vary the rate at which the electron beam of the device 16 is caused to scan the screen of that device. Thus, there is provided a corrective measure for variations in speed of the playback transducer 10.

Figure 3B:
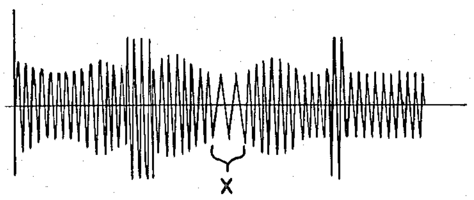
Figure 3C:
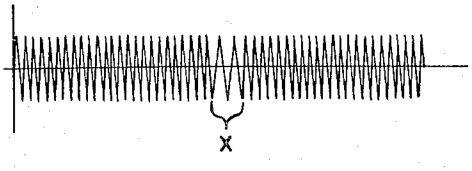
Figure 2:
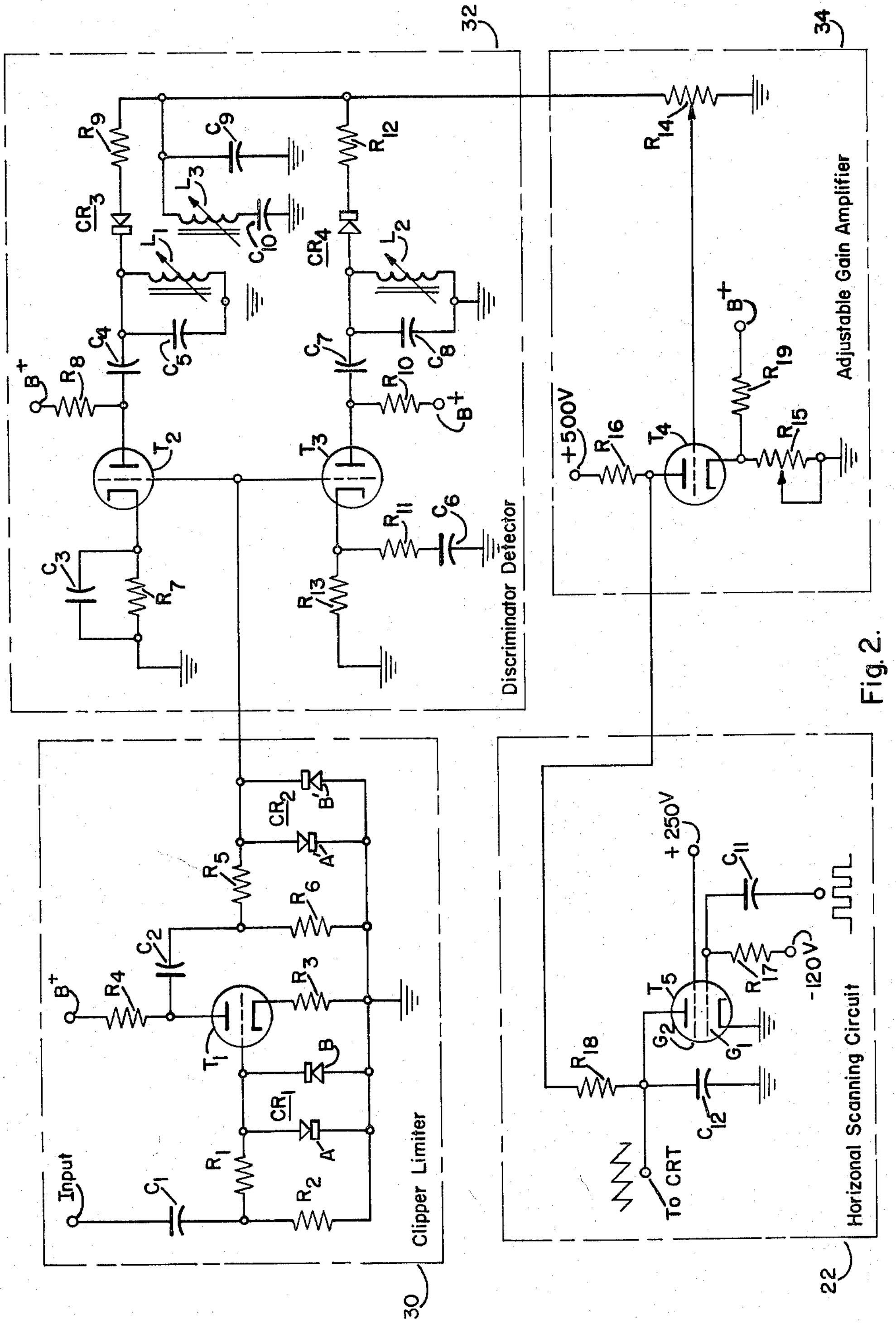
FIG. 2 is a schematic representation of a portion of the system of FIG. 1 which includes the correction means of the present invention.

With reference now to FIG. 2, there is shown in detail one embodiment of circuitry which is suitable for providing the signal which varies the rate of scan of the display device 16. For purposes of illustration it is assumed that the video information was recorded as an amplitude modulation on a constant frequency carrier, which signal is reproduced by the playback transducer 10. The constant frequency carrier acts as the continuous synchronization signal or time reference base. The signal produced by the playback transducer 10 which is applied to the input terminal of the clipper-limiter circuit 30 is illustrated in FIG. 3A. It is noted that the information does not provide 100 percent modulation of the carrier. This signal is applied through a capacitor $C_1$ and resistors $R_1$ and $R_2$ to a clipper $CR_1$. The clipper $CR_1$ is comprised of two diode units A and B which are connected in parallel with their polarities in opposite directions. The diode units A and B of $CR_1$ may be silicon diodes and are selected such that they do not conduct in the forward direction until a certain critical value, for example, 0.5 volt is reached. At values above the forward conduction value of the diodes, the signal is passed to ground, and thus at the output end of the clipper $CR_1$ there is provided an envelope of fairly constant magnitude (FIG. 3B). Inasmuch as the envelope of the output of the clipper $CR_1$ may not be as constant as is desired, it may be desirable to further clip this signal. This further clipping may be achieved by first amplifying the signal from $CR_1$ and then performing a second clipping operation. Thus the signal, as represented in FIG. 3B, may be applied to the control grid of a vacuum tube $T_1$, the plate of which is connected to a suitable B+ supply through a resistor $R_4$ and cathode of which is connected to ground through a suitable cathode resistor $R_3$. The amplified signal from $T_1$ is supplied to a second clipper $CR_2$, having diodes A′ and B′, through a suitable capacitor resistor arrangement including $C_2$, $R_6$ and $R_5$, all of which correspond to the preceding clipper arrangement to provide a signal which is more nearly constant in amplitude. The preferred signal envelope as is found at the output of the second clipper $CR_2$ is represented in FIG. 3C.

Although the signal at the output of $CR_2$ is of constant magnitude, any variation in the relative speed between the playback transducer and its associated recording medium will appear as a frequency modulation of the carrier throughout the circuitry thus far described. This is illustrated at X in each of FIGS. 3A, 3B and 3C.

The constant amplitude, frequency modulated signal from the clipper-limiter 30 is applied simultaneously to the grids of two vacuum tubes $T_2$ and $T_3$ (amplifiers), the plates of which are connected to suitable B+ potentials through, respectively, resistors $R_8$ and $R_{10}$. The cathode of $T_2$ is connected to ground through a parallel combination of resistor $R_7$ and capacitor $C_3$ while the cathode of $T_3$ is connected to ground through a resistor $R_{13}$ which is in parallel with a resistor $R_{11}$ in series with a capacitor $C_6$.

The plate of $T_2$ is connected through a capacitor $C_4$ to a tuned tank circuit comprising the parallel combination of a capacitor $C_5$ and variable inductor $L_1$. The components $C_5$ and $L_1$ of this tuned tank circuit are chosen of a value to provide that the circuit is resonant below the frequency of the recorded carrier. In a similar manner, the plate of $T_3$ is connected through a capacitor $C_7$ to a tank circuit comprising a capacitor $C_8$ and an inductor $L_2$. This latter tank circuit is tuned above the frequency of the carrier approximately the same amount as the former tank circuit was tuned below.

The amplitude of the two output signals from each of the two tank circuits is determined by the proximity of the signal to the resonant frequency of the tank circuit. These two signals are rectified in opposite polarity respectively by the diodes $CR_3$ and $CR_4$ and are fed to a resistive mixer formed by resistors $R_9$, $R_{12}$ and $R_{14}$ which in turn provides an output which is the vector sum of the two signals.

At the junction point of these latter three resistors, there may be provided a filter network comprised of an inductor $L_3$ and two capacitors $C_9$ and $C_{10}$. This filter serves to remove ripple from the rectified signal of the two discriminator circuits.

With reference now to the horizontal scanning circuit 22, it is noted that there is provided a tube, $T_5$, which is normally cut off by the application of a relatively large negative voltage (−120 volt) applied through a resistor $R_{17}$ to the control grid $G_1$ thereof. There is also applied, to the control grid $G_1$ of $T_5$, a synchronizing pulse, shown in the form of a square wave. This pulse (one for each horizontal line) is of sufficient magnitude to cause tube $T_5$ to conduct. Tube $T_5$ does not conduct during the period of sweep. The cathode tube $T_5$ is connected to ground while the plate thereof is connected to a high positive potential through two resistors $R_{18}$ and $R_{16}$. A capacitor, $C_{12}$, which is connected between resistor $R_{18}$ and ground, charges in a positive direction during the time between successive synchronizing pulses. The rate of change of voltage across capacitor $C_{12}$, that is, the slope of the sawtooth, is proportional to the voltage at which the upper end of resistor $R_{18}$ is connected. The rate at which the capacitor $C_{12}$ charges determines the horizontal scan rate of the cathode ray tube 16 in a manner well known in the art.

An adjustable gain amplifier 34 is connected between the horizontal scanning circuit 22 and the resistive mixer comprising resistors $R_9$, $R_{12}$, and $R_{14}$. This amplifier 34 includes a triode $T_4$, the plate of which is connected to a high positive potential (e.g. +500 volts) through the resistor 16. The cathode of triode $T_4$ is connected to ground through an adjustable resistor $R_{15}$ and is also connected to a B+ supply through a resistor 19. The grid of triode $T_4$ is provided with a signal from resistor $R_{14}$; the connection to resistor $R_{14}$ being adjustable as will be more fully explained later. The plate circuit of triode $T_4$ serves as a source of high positive potential whose value depends upon the polarity and magnitude of the correction voltage from the tube discriminator circuits at the movable arm of resistor $R_{14}$. Triode $T_4$ is preferred adjusted so that with its grid voltage equal to zero, capacitor $C_{12}$ charges at a prescribed rate, this rate being the normal scan rate of the display device 16.

In operation, if the tape is being run at proper speed, the signal input to each of the tank circuits is at center frequency of the discriminator and the outputs from each of the two tank circuits are equal but of opposite polarity. Thus, there is a cancellation of these voltages, a resultant zero potential across resistor $R_{14}$ and, therefore, a zero potential applied to the grid of the tube $T_4$. Hence the capacitor $C_{12}$ charges at a rate corresponding to the normal scan rate of the cathode ray tube 16. However, if the tape speed is slow, the input signal to each of the two tank circuits $C_5$–$L_1$ and $C_8$–$L_2$ appears at a frequency lower than the center frequency of the discriminator. In this case, the output from tank circuit $C_5$–$L_1$ is greater than that from tank circuit $C_8$–$L_2$ resulting in a positive potential across resistor $R_{14}$ which in turn results in a positive potential being applied to the grid of tube $T_4$. Thus there is a subsequent reduction in the plate voltage of tube $T_4$. This latter reduction in voltage results in a slower charge rate of capacitor $C_{12}$ and hence a slower rate of scan in the cathode ray tube 16. In a similar manner, if the tape speed is too fast, the resultant voltage across resistor $R_{14}$ is negative and the rate at which capacitor $C_{12}$ charges, and hence the cathode ray tube scanning rate is increased. There is thus produced a system which automatically compensates for variation in the tape speed by providing a change in the scanning rate of the display device 16.

As a practical example of values, the amplitude modulated carrier frequency may be in the audio range, for example, approximately 2,700 cycles per second. In such an example, the tank circuit $C_5$–$L_1$ may be tuned to approximately 2,200 cycles per second while the tank circuit $C_8$–$L_2$ may be tuned to a frequency of approximately 3,200 cycles per second. In the filter network, $L_3$ and $C_{10}$ may be resonant at 2,700 cycles per second. A suitable listing of values for a system such as has been described is as follows (resistances in ohms and capacitances in microfarads):

| | |
|---|---|
| $R_1$ | 220K. |
| $R_{2,6}$ | 470K. |
| $R_3$ | 1.5K. |
| $R_{4,8,10}$ | 47K. |
| $R_5$ | 100K. |
| $R_{7,13}$ | 1K. |
| $R_{9,12}$ | 18K. |
| $R_{16}$ | 1 meg. |
| $R_{11}$ | 150. |
| $R_{14}$ | 100K potentiometer. |
| $R_{15}$ | 10K potentiometer. |
| $R_{17}$ | 820K. |
| $R_{18}$ | 37 meg. |
| $R_{19}$ | 150K. |
| $C_1$ | .1. |
| $C_2$ | .01. |
| $C_3$ | 20. |
| $C_6$ | 20. |
| $C_{4,7,8}$ | .02. |
| $C_5$ | .025. |
| $C_9$ | .022. |
| $C_{10}$ | .018. |
| $C_{11}$ | .002. |
| $C_{12}$ | .015. |
| $L_{1,2,3}$ | 50–215 millihenrys. |

The diodes of $CR_1$ and $CR_2$ may be type 1N1222 while those of $CR_3$ and $CR_4$ may be type 1N34.

While there have been shown and described what are at present considered to be the preferred embodiment of the invention, modifications thereto will readily occur to those skilled in the art. For example, it is apparent that although the device has been described with reference to an amplitude modulated carrier, any constant frequency tone may be recorded on the tape, either on the same or on a separate track and that such a tone will function equally well for the sensing of speed variation within the playback transducer. It is not desired, therefore, that the invention be limited to the specific arrangement shown and described, and it is intended to cover in the appended claims all such modifications as fall within the true spirit and scope of the invention.

I claim as my invention:

1. A system for the reproduction of recorded video information comprising; a tape onto which there has been recorded video information and a time reference base; transducer means; means for moving said tape past said transducer means whereby there is produced a first electrical signal corresponding to the video information and the time reference base recorded on said tape; means including a cathode ray tube having a scanning electron beam for producing a video representation of the video portion of said first electrical signal, said latter means also including means for determining the rate of speed at which the beam of said cathode ray tube scans; means responsive to the time reference base portion of said electrical signal for producing a second electrical signal, said second electrical signal varying in accordance with variances in the rate of speed at which said tape is moved past said transducer means; and means for applying said second electrical signal to said scanning rate determining means whereby said second electrical signal varies said scan rate to correspond to the rate of movement of said tape.

2. A system for the reproduction of recorded video pattern comprising: record means having information recorded thereon, said information corresponding to a desired video pattern and a continuous synchronization signal; transducer means for the production of an electrical signal representative of said recorded information, said electrical signal being produced through relative movement between said record means and said transducer means; means including an image screen which is scanned, on a line by line basis, by an electron beam for producing an image corresponding to said recorded video information; means for determining the rate at which said electron beam scans said image screen; means responsive to said recorded continuous synchronization signal, said latter means productive of an electrical signal which is representative of the relative movement between said record means and said transducer means; and means for applying said latter electrical signal to said scanning rate determining means whereby the scan rate is varied in accordance with said latter electrical signal.

3. In a system for the reproduction of a recorded video picture: a recording medium upon which is recorded an amplitude modulated, constant frequency carrier in which said amplitude modulation is representative of said recorded video picture; transducer means employing relative movement between said transducer means and said recording medium whereby said recorded amplitude modulated carrier frequency is substantially reproduced as an electrical signal; a cathode ray tube having a display screen and an electron beam, said electron beam scanning said screen on a line by line basis; means for determining the rate at which said beam scans said screen; means for applying the amplitude modulation portion of said electrical signal to said cathode ray tube whereby said electron beam is intensity modulated; means for sensing variations in said constant frequency carrier portion of said signal occasioned by variations in the relative movement between said recording medium and said transducer, said sensing means providing an additional electrical signal representative of said variations in movement; and means for applying said additional electrical signal to said scanning rate determining means whereby the rate of scan is varied.

4. A system for the reproduction of recorded video information comprising: a recording medium having recorded thereon video information and a time reference base; transducer means productive of an electrical signal in response to relative movement between said transducer means and said recording medium, said electrical signal corresponding to said video information and said time reference base; means including an image display screen scanned by an electron beam on a line by line basis for the production of a pattern corresponding to said video information in response to the video information portion of said electrical signal, said latter means also including means for determining the rate at which said electron beam scans said image display screen; circuit means responsive to the time reference base portion of said electrical signal whereby variances in the rate of relative movement between said transducer means and said recording medium are productive of a correction signal; and means for applying said correction signal to said scanning rate determining means whereby the scanning rate is varied in accordance with said variances in the relative movement between said transducer means and said recording medium.

5. In a system for the reproduction of recorded video information: a recording medium having recorded thereon video information and a continuous synchronization signal; transducer means responsive to relative motion with said recording medium for producing an electrical signal corresponding to said video information and said continuous synchronization signal; means including an image display screen scanned on a line by line basis by an electron beam for the production of a pattern corresponding to the video information portion of said electrical signal, said latter means also including means for determining the rate at which said electron beam scans said image display screen; discriminator means responsive to said continuous synchronization signal portion of said electrical signal, said discriminator means productive of an additional electrical signal in response to variations in the rate of relative motion between said transducer means and said recording medium; and means for applying said additional electrical signal to said scanning rate determining means whereby said scanning rate is varied in accordance with said variations in the rate of relative motion between said transducer means and said recording medium.

6. In a system for the reproduction of recorded video information: a recording medium having recorded thereon video information and a constant frequency reference base; transducer means responsive to relative motion with said recording medium for the production of a first electrical signal corresponding to said video information and said constant frequency reference base; means including an image display screen scanned on a line by line basis by an electron beam for the production of a pattern corresponding to the video information portion of said electrical signal; means for determining the rate at which said electron beam scans said image display screen; discriminator means including first and second tank circuits, said tank circuits being resonant respectively at frequencies above and below the frequency of said reference base; means for applying said reference base portion of said electrical signal simultaneously to said tank circuits; and means for applying the outputs of said tank circuits to said scanning rate determining means whereby variations in the rate of relative movement between said transducer means and said recording medium are compensated for by varying the rate of scanning.

No references cited.